US006665437B1

(12) United States Patent
Chi et al.

(10) Patent No.: US 6,665,437 B1
(45) Date of Patent: Dec. 16, 2003

(54) METHOD FOR RECOGNIZING MULTI-LANGUAGE PRINTED DOCUMENTS USING STROKES AND NON-STROKES OF CHARACTERS

(75) Inventors: Su Young Chi, Taejon (KR); Weon Geun Oh, Taejon (KR); Kyung Ae Moon, Taejon (KR); Young Sup Hwang, Taejon (KR); Dae Geun Jang, Taegu (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/484,533

(22) Filed: Jan. 18, 2000

(30) Foreign Application Priority Data

Dec. 24, 1999 (KR) ........................................... 99-61946

(51) Int. Cl.[7] ................................................ G06K 9/46

(52) U.S. Cl. ....................... 382/190; 382/176; 382/202; 382/229

(58) Field of Search ................................ 382/112, 151, 382/159, 173, 176, 181, 185–187, 190, 195–196, 202, 204, 229, 254, 258, 292, 298, 309, 310, 437; 345/660, 670, 671; 308/451; 708/208

(56) References Cited

U.S. PATENT DOCUMENTS 4,032,887 A * 6/1977 Roberts ...................... 382/310
4,468,808 A 8/1984 Mori et al. ................. 382/196
4,561,106 A * 12/1985 Yoshida et al. ............. 382/203
4,903,313 A * 2/1990 Tachikawa .................. 382/171
5,271,068 A * 12/1993 Ueda et al. ................. 382/216
5,325,447 A * 6/1994 Vogt, III ...................... 382/102
5,442,715 A * 8/1995 Gaborski et al. ........... 382/187
5,715,336 A * 2/1998 Tanaka ........................ 382/301
5,740,273 A * 4/1998 Parthasarathy et al. ..... 382/187
6,011,879 A * 1/2000 Nemoto et al. ............. 382/301
6,026,177 A * 2/2000 Mong et al. ................ 382/156
6,188,790 B1 * 2/2001 Yoshikawa et al. ......... 382/194
6,272,238 B1 * 8/2001 Kugai ........................ 382/165
6,366,699 B1 * 4/2002 Kuwano et al. ............ 382/199

OTHER PUBLICATIONS

Krtolica, et al. discloses “Two–stage connectivity algorithm for optical character recognition”, IEEE, pp. 179–182, 1993.*

Smith, et al. discloses “Handwritten character classification using nearest neighbor in large databases”, IEEE, pp. 915–919, 199.*

* cited by examiner

*Primary Examiner*—Daniel G. Mariam
(74) *Attorney, Agent, or Firm*—Jacobson Holman PLLC

(57) ABSTRACT

Disclosed is a method for recognizing multi-language printed documents, a method for extracting character features according to the present invention, the method comprising the steps of: a) normalizing characters to a fixed size; b) converting the size-fixed characters into mesh-type characters; c) extracting stroke features of each of the mesh-type characters; d) extracting non-stroke features of each of the mesh-type characters; and e) extracting the character features using the stroke features and the non-stroke features. The present invention provides a high recognition rate irrespective of the size and modification of the characters, by extracting the character feature from the stroke and non-stroke in the mesh block.

6 Claims, 8 Drawing Sheets

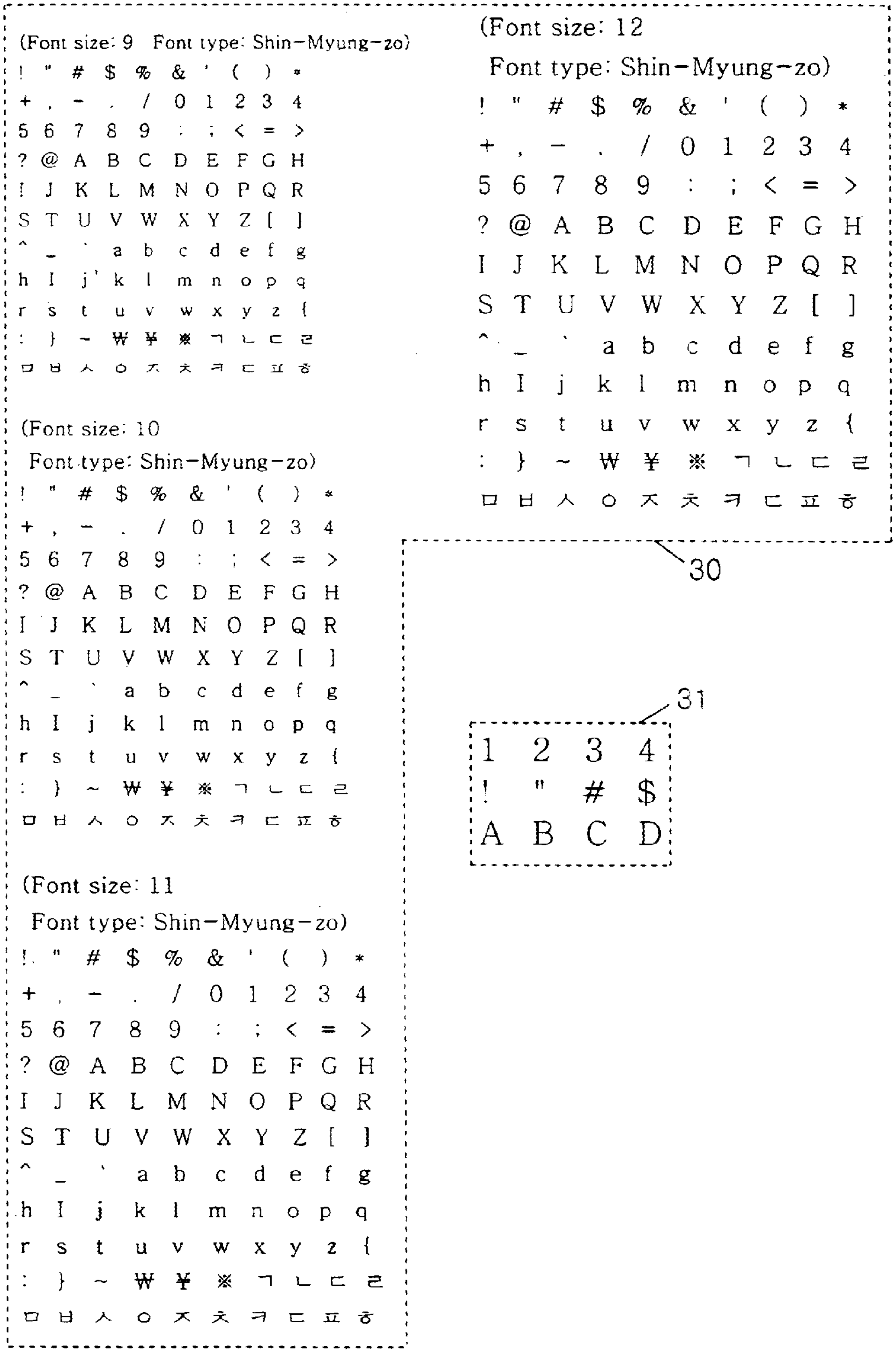

FIG. 4

(Font size: 9  Font type: Shin-Myung-zo)
! " # $ % & ' ( ) *
+ , - . / 0 1 2 3 4
5 6 7 8 9 : ; < = >
? @ A B C D E F G H
I J K L M N O P Q R
S T U V W X Y Z [ ]
^ _ ` a b c d e f g
h I j ' k l m n o p q
r s t u v w x y z {
: } ~ ₩ ¥ ※ ㄱ ㄴ ㄷ ㄹ
ㅁ ㅂ ㅅ ㅇ ㅈ ㅊ ㅋ ㄷ ㅍ ㅎ

(Font size: 10
Font type: Shin-Myung-zo)
! " # $ % & ' ( ) *
+ , - . / 0 1 2 3 4
5 6 7 8 9 : ; < = >
? @ A B C D E F G H
I J K L M N O P Q R
S T U V W X Y Z [ ]
^ _ ` a b c d e f g
h I j k l m n o p q
r s t u v w x y z {
: } ~ ₩ ¥ ※ ㄱ ㄴ ㄷ ㄹ
ㅁ ㅂ ㅅ ㅇ ㅈ ㅊ ㅋ ㄷ ㅍ ㅎ

(Font size: 11
Font type: Shin-Myung-zo)
! " # $ % & ' ( ) *
+ , - . / 0 1 2 3 4
5 6 7 8 9 : ; < = >
? @ A B C D E F G H
I J K L M N O P Q R
S T U V W X Y Z [ ]
^ _ ` a b c d e f g
h I j k l m n o p q
r s t u v w x y z {
: } ~ ₩ ¥ ※ ㄱ ㄴ ㄷ ㄹ
ㅁ ㅂ ㅅ ㅇ ㅈ ㅊ ㅋ ㄷ ㅍ ㅎ

(Font size: 12
Font type: Shin-Myung-zo)
! " # $ % & ' ( ) *
+ , - . / 0 1 2 3 4
5 6 7 8 9 : ; < = >
? @ A B C D E F G H
I J K L M N O P Q R
S T U V W X Y Z [ ]
^ _ ` a b c d e f g
h I j k l m n o p q
r s t u v w x y z {
: } ~ ₩ ¥ ※ ㄱ ㄴ ㄷ ㄹ
ㅁ ㅂ ㅅ ㅇ ㅈ ㅊ ㅋ ㄷ ㅍ ㅎ

| | | 4 | | | | 4 | | | | 4 | | | | 4 | | |
|---|---|---|---|---|---|---|---|---|---|---|---|---|---|---|---|---|
| | 0 | 0 | 0 | 0 | 0 | 0 | 0 | s2 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| | 0 | 0 | s1 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | s16 | 0 |
| 4 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |

Si=max(Wi * Hi), WHERE i IS POSITION IN 16x16 MESH

SPi=ASCENDING SORT, i=1~16

FIG. 8

| | 1 | | | 5 | | | | 4 | | | | | 5 | | | 1 |
|---|---|---|---|---|---|---|---|---|---|---|---|---|---|---|---|---|
| 1 | 0 | 0 | 0 | 0 | 0 | 0 | 0 | o | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | s1 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | s16 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |

Si=max(Wi * Hi), WHERE i IS POSITION IN 16x16 MESH

SPi=ASCENDING SORT, i=1~9

METHOD FOR RECOGNIZING MULTI-LANGUAGE PRINTED DOCUMENTS USING STROKES AND NON-STROKES OF CHARACTERS

FIELD OF THE INVENTION

The present invention relates to a picture processing technique in a pattern recognition field; and, more particularly, to a method for recognizing multi-language printed documents.

DESCRIPTION OF THE PRIOR ARTS

Most of general documents have been drawn up by different characters, including multi-language, such as Korean, English and Chinese, together with unique marks and figures. Accordingly, it is very important to extract proper features to these different characters in recognizing these different characters, which are included in the documents.

Feature extraction systems for a single language have been developed and multi-fonts are introduced in this picture processing technique. However, the conventional feature extraction systems for such a single language can not recognize the multi-languages having various features on their fonts. Further, a method for recognizing multi-language printed documents, which uses both a letter portion and a background portion in the type of mesh of a predetermined standard as one feature for extraction, has been not introduced.

SUMMARY OF THE INVENTION

It is, therefore, an object of the present invention to provide a method for recognizing multi-language printed documents having different styles of fonts.

It is another object of the present invention to provide a method improving a recognition rate by extracting a geometrical feature in both a letter portion and a background portion in the type of mesh.

In accordance with an aspect of the present invention, there is provided a method for extracting character features for recognizing characters, the method comprising the steps of: a) normalizing the characters to a fixed size; b) converting the size-fixed characters into mesh-type characters; c) extracting stroke features of each of the mesh-type characters; d) extracting non-stroke features of each of the mesh-type characters; and e) extracting the character features using the stroke features and the non-stroke features.

In accordance with another aspect of the present invention, there is provided a method for extracting character features for recognizing characters, the method comprising the steps of: i) inputting the characters into an input means; ii) printing the input characters and scanning the printed characters to make character pictures; iii) constructing a standard input character set using the character pictures; iv) normalizing the character pictures to a fixed size; v) converting the size-fixed characters into mesh-type characters; vi) extracting stroke features of each of the mesh-type characters; vii) extracting non-stroke features of each of the mesh-type characters; and viii) extracting the character features using the stroke features and the non-stroke features.

BRIEF DESCRIPTION OF THE DRAWINGS

Other objects and aspects of the invention will become apparent from the following description of the embodiments with reference to the accompanying drawings, in which:

FIG. 4 is a view of an example of a standard character picture database through a scanner, which receives input characters with different resolution and concentration on printed documents, according to the present invention;

FIG. 7 is a view illustrating a stroke feature extraction according to the present invention; and FIG. 8 is a view illustrating a non-stroke feature extraction according to the present invention.

DETAILED DESCRIPTION OF THE PREFERRED EMBODIMENTS

Hereinafter, the present invention will be described in detail referring the accompanying drawings.

Figure 1:
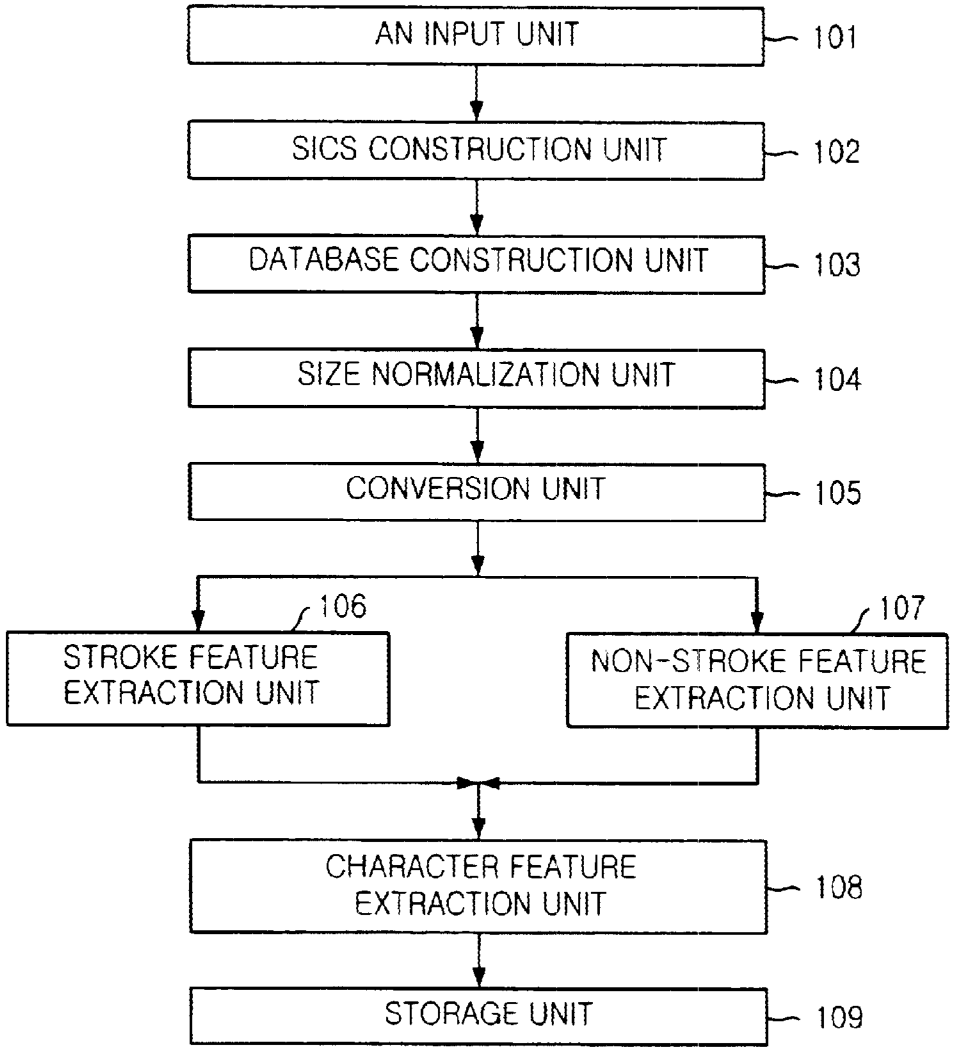
FIG. 1 is a block diagram illustrating a character feature extractor for recognizing multi-language printed documents according to the present invention.

Referring to FIG. 1, a feature extraction apparatus of characters according to the present invention includes an input unit 101, a standard input character set (SICS) construction unit 102, a database construction unit 103, a size normalization unit 104, a conversion unit 105, a stroke feature extraction unit 106, a non-stroke feature extraction unit 107, a character feature extraction unit 108 and a storage unit 109. Characters whose features are to be extracted are input into the input unit 101. The SICS construction unit 102 builds up a standard input character set, outputting the characters of multi-language having various fonts on the basis of a fixed format through a printer. The database construction unit 103 scans character pictures of the standard input character set on different resolution and concentration and the size normalization unit 104 normalizes the character pictures to a fixed size. The conversion unit 105 converts the size-normalized character pictures into mesh-typed characters of 16×16 size through a 3×3 mask operation. Subsequently, the stroke feature extraction unit 106 extracts character-related features from topographical information of each of the mesh-typed characters converted in the conversion unit 105 and the non-stroke feature extraction unit 107 also extracts background-related features from topographical information of each of the mesh-typed characters converted in the conversion unit 105. The character feature extraction unit 108 extracts character features, using the character-related features from the stroke feature extraction unit 106 and the background-related features from the non-stroke feature extraction unit 107, and the storage unit 109 stores the extracted features from the character feature extraction unit 108.

Figure 2:
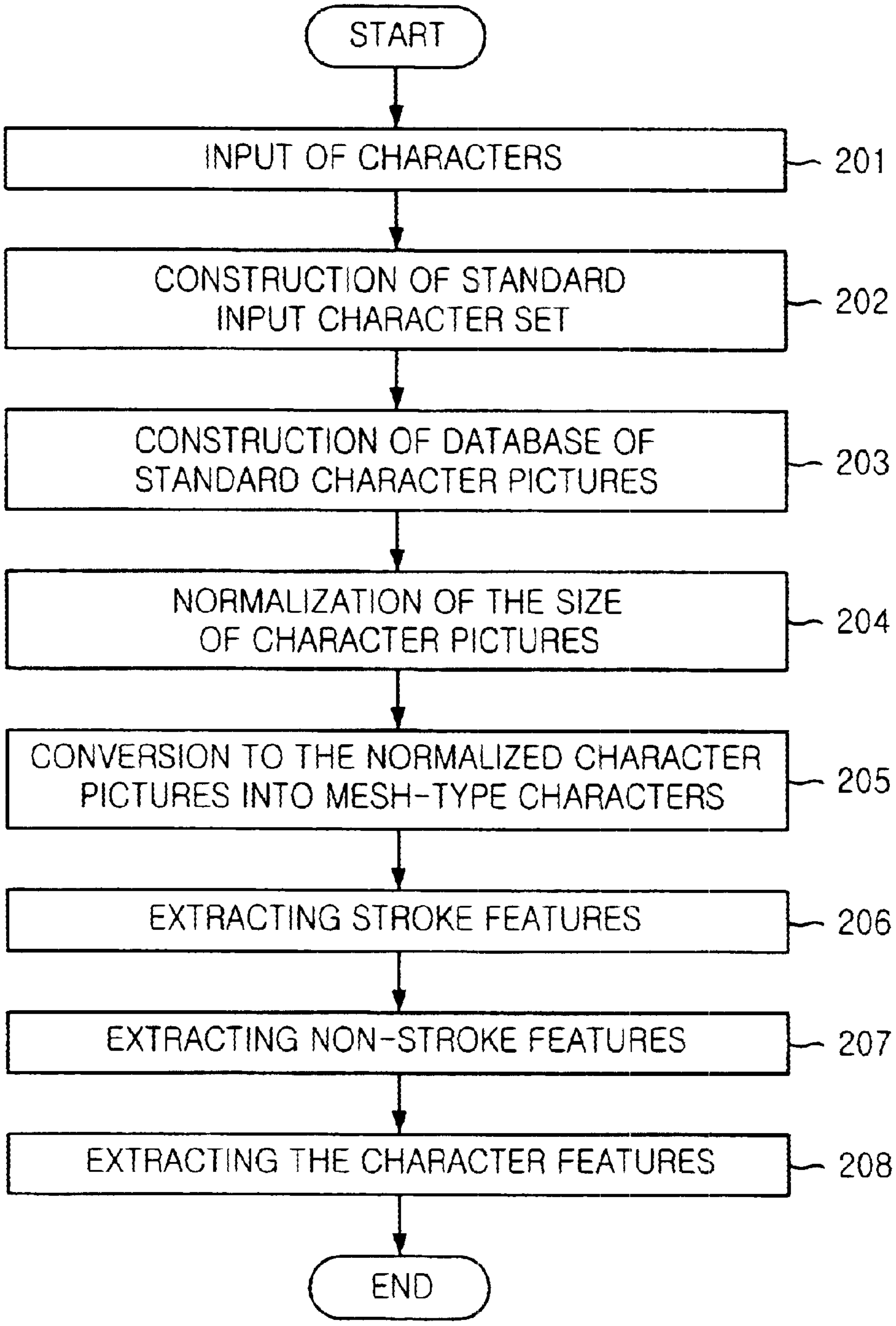
FIG. 2 is a flow chart illustrating a method for recognizing multi-language printed documents according to the present invention.
Figure 3:
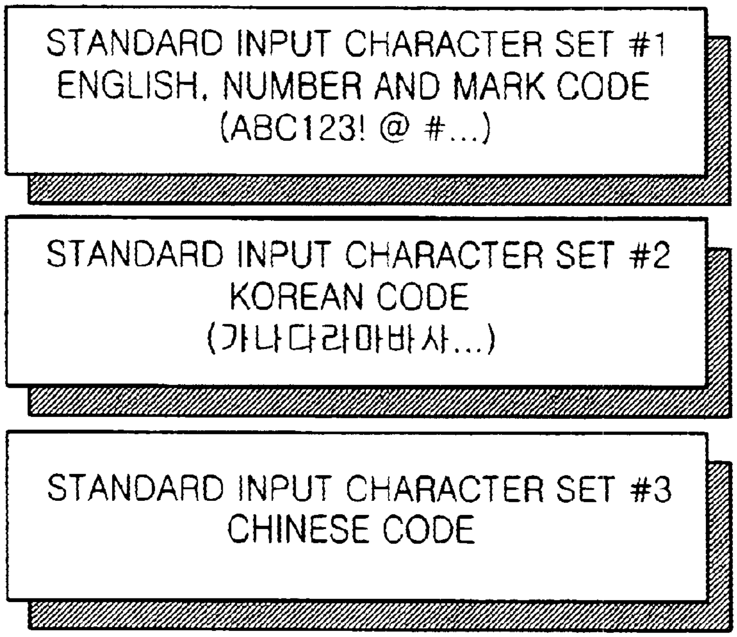
FIG. 3 is a view of an example of standard input character sets based on to standard character codes, which create a specific database of the standard characters, according to the present invention.

FIG. 2 is a flow chart illustrating a method for recognizing multi-language printed documents according to the present invention. As shown in FIG. 2, if characters are input via an input device at step 201, a standard input character set is constructed by printing the input characters according to a standard character code at step 202. At step 202, the characters are arranged based on a fixed format and then the arranged characters are printed to construct the standard input character set. FIG. 3 shows three kinds of standard input character sets. The number of standard input character sets depends on how many languages, marks and figures appear in the printed documents. In FIG. 3, a first standard input character sets is constructed based on a code with respect to English, numeral and mark and second and to third standard input character sets are constructed based on Korean and Chinese codes, respectively.

At step 203, a database is constructed, using the character pictures of the standard input character set which is taken by a scanner with different resolutions and concentrations. That is, the character pictures of the standard input character set are scanned on different resolutions and concentrations of the scanner and then the scanned character pictures according to the various levels of the scanner constructs a database. FIG. 4 is a view of an example to construct a standard character picture database through the scanner.

Figure 5:
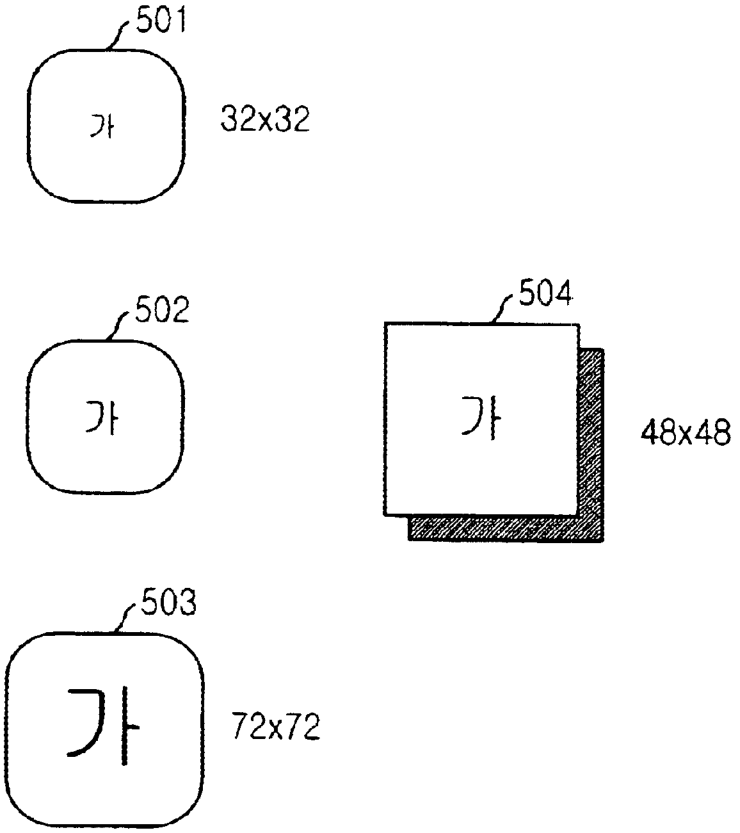
FIG. 5 is a view illustrating a size normalization of the input picture according to the present invention.

At step 204, the character pictures, which are constructed in the database, are normalized to a fixed size. In FIG. 5, when character pictures 501 to 503 (which is one of Korean characters) of different size are input, these character pictures are normalized to a fixed size, 48×48 size.

Figure 6:
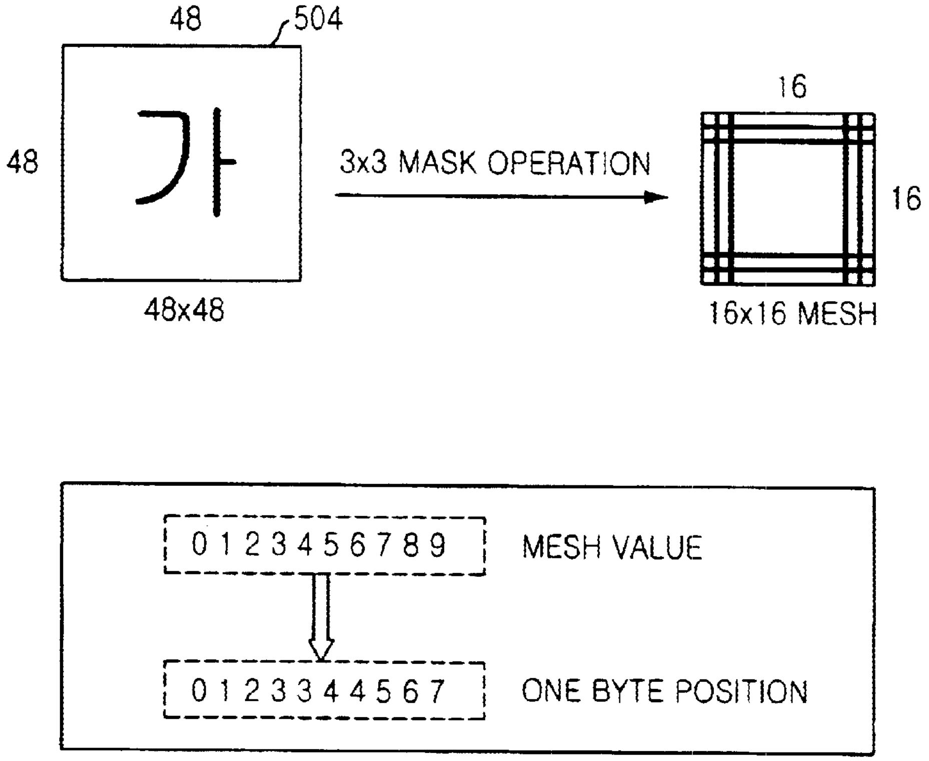
FIG. 6 is a view illustrating an accumulated mesh conversion according to the present invention.

At step 205, the normalized character picture 504 at step 203 are converted into a mesh-type character picture and mesh values of the converted character-picture are accumulated. As shown in FIG. 6, the normalized character picture 504 of 48×48 size is subject to a 3×3 mask operation, then the normalized character picture 504 is converted into the mesh-type character picture having nine mesh blocks of 16×16 and each mesh block has one of mesh values of 0 to 9. Each of the mesh values in the mesh-type character picture are converted into 8 one-byte positions and then coordinate values of the same character are accumulated in a storage device.

At steps 206, the features of strokes of the mesh-type character picture are extracted using the mesh values. The 16×16 mesh block is divided into 16 small-sized mesh blocks of 4×4 as shown in FIG. 7. A frequency of the accumulation of a stroke in the 4×4 mesh block and an accumulation value of the Hamming distance are calculated and the highest value of them is stored. The sum (Si) of weight in 16 small-sized mesh block is normalized to a fixed integer and the stroke feature vector (Spi) is extracted through an ascending sort of the sum. Here, the sum of weight is given by, $$Si=\max(Wi*Hi),$$

where “W” is the frequency of the accumulation of a stroke, “H” is the Hamming distance and “i” is position in 16×16 mesh block.

On the other hand, at step 207, features of non-strokes of the mesh-type character picture are extracted using the mesh values. Except for outermost meshes in the 16×16 mesh block, a 14×14 mesh block it is divided into 9 small-sized mesh block as shown in FIG. 8.

A frequency of the accumulation of a non-stroke (background) and an accumulation value of the Hamming distance are calculated and the highest value of them is stored. The sum of weight in 9 small-sized meshes is normalized to a fixed integer and the non-stroke feature vector (SPi) is extracted through an ascending sort of the sum. The exclusion of the outermost meshes in the 16×16 mesh block may minimize erroneous extraction between the stroke and the non-stroke in the character picture.

Finally, at step 208, 25-dimensional feature vectors (coordinate values and frequency of accumulation) are extracted by using feature vectors obtained at steps 206 and 207 and the extracted feature vectors are stored in a database to recognize the multi-language printed documents.

As apparent from the above, the character feature extraction according to the present invention improves the recognition of the multi-language or different languages on the printed documents, by extracting the character feature from the stroke and non-stroke in the mesh block. Accordingly, the present invention has a high recognition rate irrespective of the size and modification of the characters.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for extracting character features for recognizing characters, the method comprising the steps of:

a) normalizing each of the characters to a fixed size;

b) converting each size-fixed character into mesh-type character composed of N×N mesh-blocks, wherein the N is a positive integer number and each of the N×N mesh-blocks has a mesh value of corresponding part of the size-fixed character;

c) extracting a stroke feature of the mesh-type character based on the mesh values of mesh-blocks related to a stroke part of the size-fixed character;

d) extracting a non-stroke feature of the mesh-type character based on the mesh values of mesh-blocks related to a non-stroke part of the size-fixed character; and e) extracting the character feature of the size-fixed character based on the stroke feature and the non-stroke feature, wherein the step c) includes the steps of:

c-1) accumulating position values of mesh-blocks related to the stroke of the size-fixed character; and c-2) extracting the stroke features from the accumulated position values, wherein the step b-2) has the steps of:

c-2-1) calculating accumulation frequency and an accumulation value of the Hamming distance with respect to each mesh-block related to the stroke of the size-fixed character in a mesh block set and storing the calculated accumulation frequency and the accumulation value of the Hamming distance of each mesh-block related to the stroke of the size-fixed character in the mesh block set, wherein the mesh block set has a predetermined number of the mesh blocks;

c-2-2) selecting the highest value among the stored calculated accumulation frequency and the accumulation values in the step j);

c-2-3) normalizing a sum of weight of the mesh block set to a fixed integer; and c-2-4) selecting the stroke feature from the highest values among the mesh block set of the size-fixed character based on the normalized integers.

2. The method as recited in claim 1, wherein the step d) includes:

f) accumulating position values of mesh-blocks related to the non-stroke of the size-fixed character; and g) extracting the non-stroke features from the accumulated position values.

3. The method as recited in claim 2, wherein the step g) includes the steps of:

h) calculating accumulation frequency and an accumulation value of the Hamming distance with respect to each mesh-block related to the non-stroke of the size-fixed character in a mesh block set and storing the calculated accumulation frequency and the accumulation value of the Hamming distance of each mesh-block related to the non-stroke of the size-fixed character in the mesh block set, wherein the mesh block set has a predeteremined number of the mesh blocks;

i) selecting the highest value among the stored calculated accumulation frequency and the accumulation values in the step h);

j) normalizing a sum of weight of the mesh block set to a fixed integer; and k) selecting the non-stroke feature from the highest values among the mesh block set of the size-fixed character based on the normalized integers.

4. The method as recited in claim 3, wherein the mesh-type character includes a plurality of the mesh block set and the sub-set mesh block has a predetermined integer number of the mesh blocks.

5. A method for extracting character features for recognizing characters, the method comprising the steps of:

i) inputting the characters into an input means;

ii) printing the input characters and scanning the printed characters to make character pictures;

iii) constructing a standard input character set using the character pictures;

iv) normalizing the character pictures to a fixed size;

v) converting each of the size-fixed character pictures into mesh-type character composed of N×N mesh-blocks, wherein the N is a positive integer number and each of the N×N mesh-blocks has a mesh value of corresponding part of the size-fixed character;

vi) extracting a stroke feature of the mesh-type character based on the mesh values of mesh-blocks related to a stroke part of the size-fixed character;

vii) extracting a non-stroke feature of each of the mesh-type characters based on the mesh values of mesh-blocks related to a non-stroke part of the size-fixed character; and viii) extracting the character feature of the size-fixed character using the stroke feature and the non-stroke feature, wherein the step vi) includes the steps of:

vi-1) accumulating position values of mesh-blocks related to the stroke of the size-fixed character; and vi-2) extracting the stroke features from the accumulated position values, wherein the step vi-2) has the steps of:

vi-2-1) calculating accumulation frequency and an accumulation value of the Hamming distance with respect to each mesh-block related to the stroke of the size-fixed character in a mesh block set and storing the calculated accumulation frequency and the accumulation value of the Hamming distance of each mesh-block related to the stroke of the size-fixed character in the mesh block set, wherein the mesh block set has a predetermined number of the mesh blocks;

vi-2-2) selecting the highest value among the stored calculated accumulation frequency and the accumulation values in the step xi);

vi-2-3) normalizing a sum of weight of the mesh block set to a fixed integer; and vi-2-4) selecting the stroke feature from the highest values among the mesh block set of the size-fixed character based on the normalized integers.

6. The method as recited in claim 5, wherein the step vii) includes:

xi) accumulating position values of mesh-blocks related to the non-stroke of the size-fixed character; and xii) extracting the non-stroke features from the accumulated position values.

* * * * *